United States Patent
Montgomery et al.

(10) Patent No.: US 8,555,019 B2
(45) Date of Patent: *Oct. 8, 2013

(54) USING A MIGRATION CACHE TO CACHE TRACKS DURING MIGRATION

(75) Inventors: David Montgomery, Tucson, AZ (US); Todd C. Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 276 days.

This patent is subject to a terminal disclaimer.

(21) Appl. No.: 12/877,956

(22) Filed: Sep. 8, 2010

(65) Prior Publication Data

US 2012/0059994 A1    Mar. 8, 2012

(51) Int. Cl.
G06F 12/00    (2006.01)
G06F 13/00    (2006.01)
G06F 13/28    (2006.01)

(52) U.S. Cl.
USPC ............ 711/165; 711/161; 711/162; 711/154

(58) Field of Classification Search
USPC ......... 707/667–668, 670; 711/154, 161–162, 711/165; 709/217–219
See application file for complete search history.

(56) References Cited

U.S. PATENT DOCUMENTS

| | | | |
|---|---|---|---|
| 6,912,636 B1 * | 6/2005 | Bromley et al. | 711/165 |
| 6,959,373 B2 | 10/2005 | Testardi | |
| 6,986,015 B2 | 1/2006 | Testardi | |
| 7,146,475 B2 | 12/2006 | Perego | |
| 7,171,532 B2 | 1/2007 | Kodama | |
| 7,210,021 B2 | 4/2007 | Sato et al. | |
| 7,280,536 B2 | 10/2007 | Testardi | |
| 7,490,207 B2 * | 2/2009 | Amarendran et al. | 711/165 |
| 7,565,487 B2 | 7/2009 | Taguchi et al. | |

(Continued)

OTHER PUBLICATIONS

Preliminary Amendment filed May 2, 2012 for U.S. Appl. No. 13/462,410, filed May 2, 2012 entitled "Using a Migration Cache to Cache Tracks During Migration", by inventors D. Montgomery and T.C. Sorenson.

(Continued)

*Primary Examiner* — Jared Rutz
*Assistant Examiner* — Rocio Del Mar Perez-Velez
(74) *Attorney, Agent, or Firm* — David W. Victor; Konrad Raynes Davda & Victor LLP

(57) ABSTRACT

Provided are a method, system, and computer program product for using a migration cache to cache tracks during migration. Indication is made in an extent list of tracks in an extent in a source storage subject to Input/Output (I/O) requests. A migration operation is initiated to migrate the extent from the source storage to a destination storage. In response to initiating the migration operation, a determination is made of a first set of tracks in the extent in the source storage indicated in the extent list. A determination is also made of a second set of tracks in the extent. The tracks in the source storage in the first set are copied to a migration cache, wherein updates to the tracks in the migration cache during the migration operation are applied to the migration cache. The tracks in the second set are copied directly from the source storage to the destination storage without buffering in the migration cache. The tracks in the first set are copied from the migration cache to the destination storage. The migration operation is completed in response to copying the first set of tracks from the migration cache to the destination storage and copying the second set of tracks from the source storage to the destination storage, wherein after the migration the tracks in the extent are located in the destination storage.

20 Claims, 5 Drawing Sheets

(56) References Cited

U.S. PATENT DOCUMENTS

| | | | |
|---|---|---|---|
| 7,624,230 B2 | 11/2009 | Kamei et al. | |
| 2007/0118695 A1* | 5/2007 | Lowe et al. | 711/136 |
| 2008/0147942 A1* | 6/2008 | Brown et al. | 710/200 |
| 2009/0138530 A1 | 5/2009 | Yao et al. | |
| 2010/0122050 A1* | 5/2010 | Hutchison et al. | 711/162 |

OTHER PUBLICATIONS

U.S. Appl. No. 13/462,410 filed May 12, 2012 entitled "Using a Migration Cache to Cache Tracks During Migration", by inventors D. Montgomery and T.C. Sorenson.

Office Action dated Oct. 26, 2012 for U.S. Appl. No. 13/462,410, filed May 2, 2012 by inventors D. Montgomery and T. C. Sorenson.

Response dated Jan. 28, 2013, pp. 1-15 to Office Action dated Oct. 26, 2012 for U.S. Appl. No. 13/462,410, filed May 2, 2012 by inventors D. Montgomery and T.C. Sorenson.

Notice of Allowance dated Jun. 11, 2013, pp. 1-18, for U.S. Appl. No. 13/462,410, filed May 2, 2012 by inventors D. Montgomery and T.C. Sorenson (18.365C1).

* cited by examiner

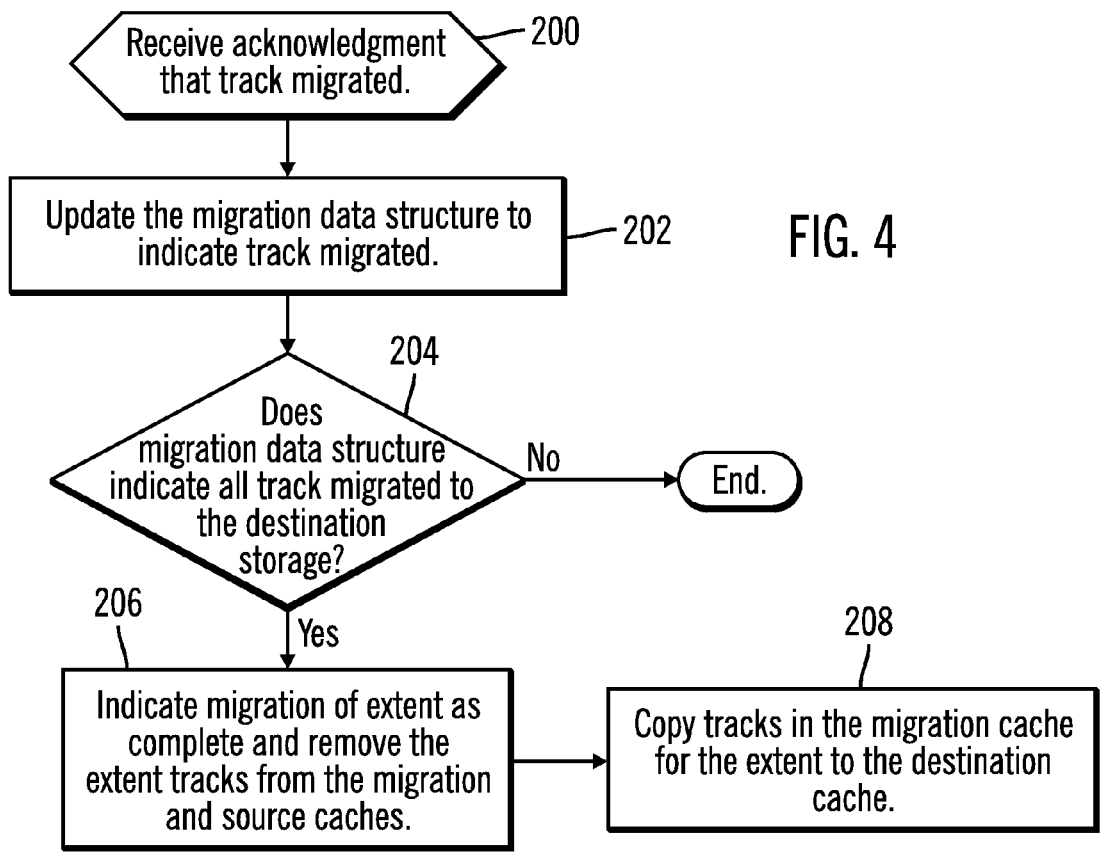
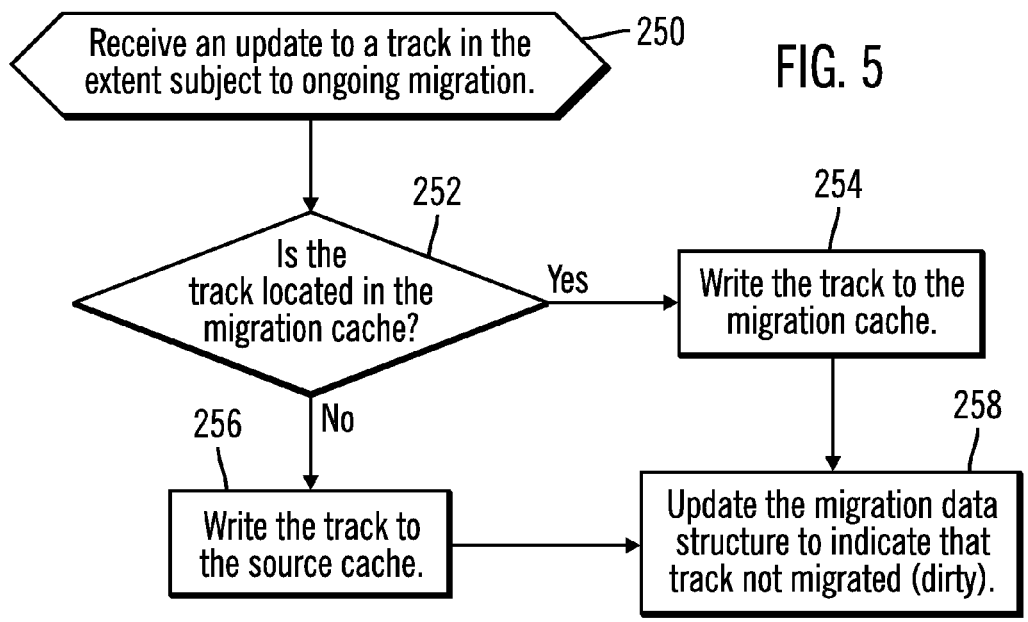

USING A MIGRATION CACHE TO CACHE TRACKS DURING MIGRATION

BACKGROUND OF THE INVENTION

1. Field of the Invention

The present invention relates to a method, system, and computer program product for using a migration cache to cache tracks during migration.

2. Description of the Related Art

In a hierarchical storage environment, extents of tracks may be migrated between different tiers of storage devices, such as hard disk drives, solid state storage devices, etc., depending on the characteristics of the storage devices and the frequency of access and priority of data. For instance, more frequently accessed extents and/or higher priority extents may be migrated to a faster access tier from a slower access tier, and less frequently accessed extents and/or lower priority extents may be migrated to a slower access tier. When migrating extents, all the data from the extent may be copied over from one storage device to another. During the migration process, the extent may be locked so that Input/Output (I/O) requests from hosts directed to the extent are quiesced and queued until migration has completed.

There is a need in the art for improved techniques for migrating extents of tracks between storage devices.

SUMMARY

Provided are a method, system, and computer program product for using a migration cache to cache tracks during migration. Indication is made in an extent list of tracks in an extent in a source storage subject to Input/Output (I/O) requests. A migration operation is initiated to migrate the extent from the source storage to a destination storage. In response to initiating the migration operation, a determination is made of a first set of tracks in the extent in the source storage indicated in the extent list. A determination is also made of a second set of tracks in the extent. The tracks in the source storage in the first set are copied to a migration cache, wherein updates to the tracks in the migration cache during the migration operation are applied to the migration cache. The tracks in the second set are copied directly from the source storage to the destination storage without buffering in the migration cache. The tracks in the first set are copied from the migration cache to the destination storage. The migration operation is completed in response to copying the first set of tracks from the migration cache to the destination storage and copying the second set of tracks from the source storage to the destination storage, wherein after the migration the tracks in the extent are located in the destination storage.

BRIEF DESCRIPTION OF THE DRAWINGS

FIG. 4 illustrates an embodiment of operations to process an acknowledgment that a track was migrated.

FIG. 5 illustrates an embodiment of operations to process an update to a track during migration.

DETAILED DESCRIPTION

Figure 1:
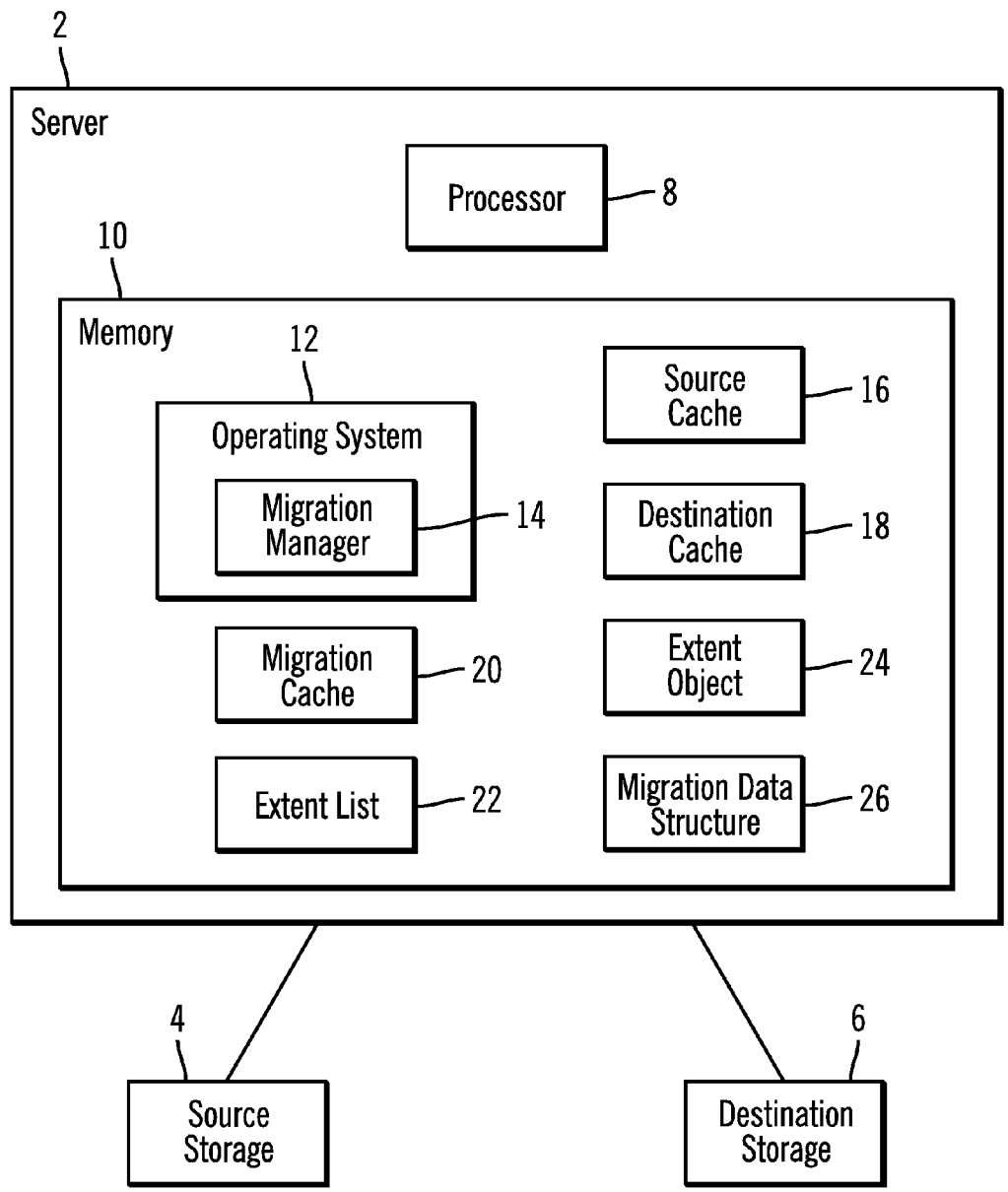
FIG. 1 illustrates an embodiment of a computing environment.

FIG. 1 illustrates an embodiment of a server 2 managing the storage of tracks of data in a source storage 4 and a destination storage 6. The server 2 may receive I/O requests from applications and hosts (not shown) to the source 4 and destination 6 storages and manage the I/O requests to the storages 4, 6. The server 2 includes a processor 8 comprising one or more processor devices and a memory 10 in which an operating system 12 is loaded to be executed by the processor 8. The operating system 12 includes a migration manager 14 to manage the migration of an extent of tracks represented by an extent object 24 between the source 4 and destination 6 storages. The extent of tracks may be active in one of the source storage 4 or destination storage 6, and may be migrated between the source 4 and destination 6 storages.

The memory 10 further includes elements 16, 18, 20, 22, 24, and 26. A source cache 16 caches writes and read data for the source storage 4. A destination cache 18 caches writes and read data for the destination storage 6, and a migration cache 20 caches a subset of the tracks in the source storage 4 subject to migration to the destination storage 6. An extent list 22 comprises a data structure, such as a stack (e.g., last in first out ordering), a queue (first in first out ordering), etc., indicating tracks in an extent subject to read and/or write requests. In one embodiment, the extent list 22 may indicate tracks subject to reads and write and, in another embodiment, may only indicate tracks subject to write operations. An extent object 24 provides information on extents configured in the storages 4, 6. A migration data structure 26 indicates tracks in an extent subject to a migration operation and, for each track, information, such as a bit, indicating whether that track in the extent in the source storage 4 was successfully copied to the destination storage 6. A migration of an extent completes when the migration data structure 26 indicates that all tracks in the extent have been migrated or copied to the destination storage 6.

In one embodiment, there may be a separate dedicated cache, e.g., the source cache 16 and destination cache 18, maintained for each storage managed by the server 2, where the server 2 may manage more than the two storages 4, 6, as shown in FIG. 1. Further, there may be one migration cache 20 maintained for each separate migration operation or the migration cache 20 may store a subset of tracks in the source storages involved in multiple migration operations.

In certain embodiments, the extent object 24 identifies tracks stored contiguously in an extent, which is advantageous in embodiments where the storage 4, 6 storing the track comprises a storage device that has improved read/write access for tracks stored contiguously in the media, such as a hard disk drive and a tape drive. However, the data for the tracks in the extent may not be contiguously stored in the storage, which may comprise a storage device that does not experience improved access for contiguously stored tracks, such as the case with a solid state storage device (SSD) or Random Access Memory (RAM) drive. The extent object 24 includes entries for each track managed in one extent. Each track may comprise a same size single unit of data. The server 2 may maintain multiple extent objects 24 for each separate extent the server 2 manages in the source 4 and destination 6 storages. Further, there may be additional storage devices, such that the server 2 may manage the migration of an extent of tracks among more than two storages, where the different storages may have different I/O access profiles.

The server 2 may communicate with the source 4 and destination storages 6 over a network, via separate cables through a storage interface, in a loop architecture, etc. The source 4 and destination 6 storages may comprise different types of storage devices, such as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The memory 10 may comprise one or more volatile or non-volatile memory devices. The migration manager 14 may alternatively be implemented as application code external to the operating system 12 or may be implemented with hardware logic, such as an Application Specific Integrated Circuit (ASIC), or as a programmable processor executing code in a computer readable storage medium.

In one embodiment, the source 4 and destination 6 storages may comprise storage tiers in a hierarchical arrangement of storage devices, where tiers define storage based on characteristics such as speed of their Input/Output (I/O) access profile, redundancy, etc. For instance, the destination storage 6 may comprise a high speed storage, such as an SSD or RAM drive, and the source storage 4 may comprise a slower access storage, such as a hard disk drive or tape medium. If the source storage 4 includes extents that are not frequently accessed and/or having lower priority, then the operating system 12 may call the migration manager 14 to migrate such extents to a slower access destination storage 6. if the source storage includes extents that are frequently accessed and/or higher priority, then the operating system 12 may call the migration manager 14 to migrate such extents to a faster access destination storage 6. Data characteristics other than or in addition to the frequency of data access and priority of the data may be used to determine whether to migrate extents between higher and lower tier storage devices in the storage hierarchy.

Figure 2:
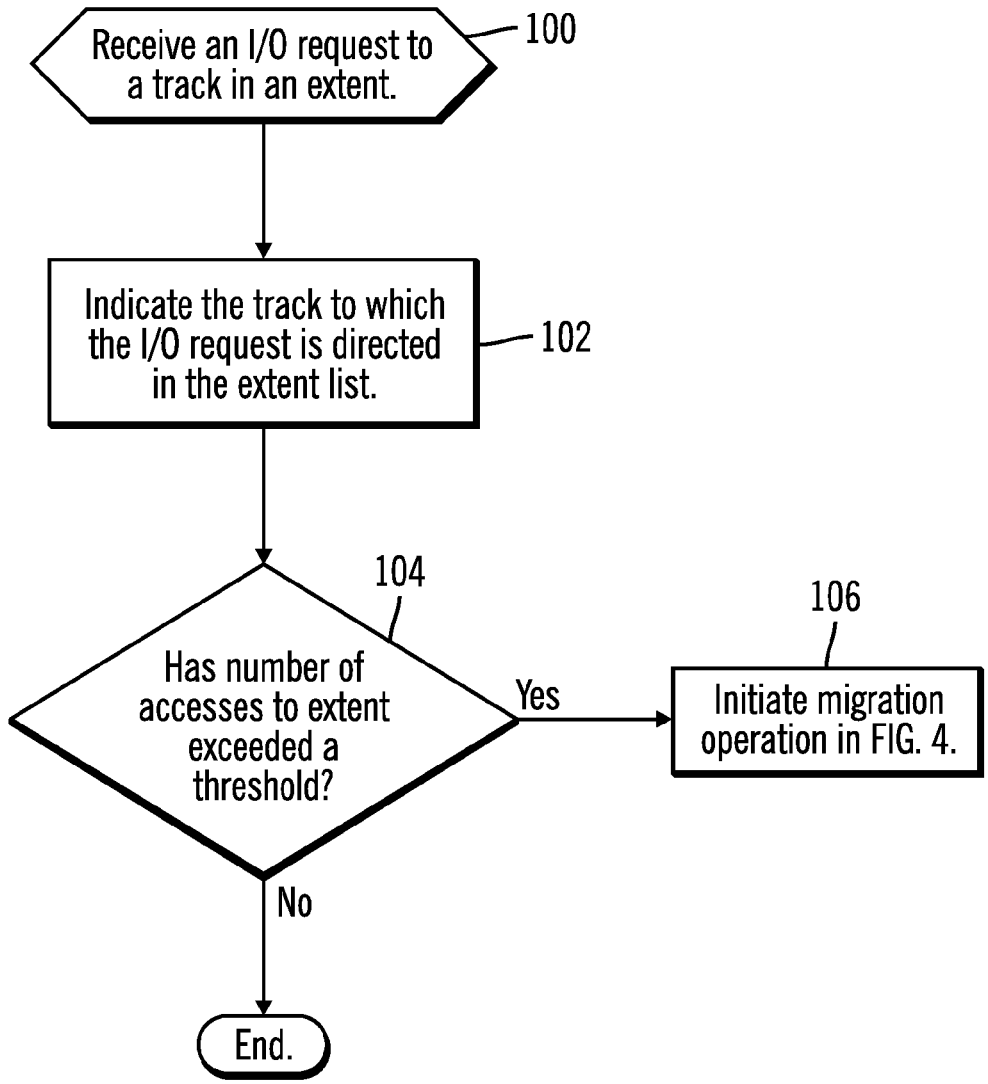
FIG. 2 illustrates an embodiment of operations to process an I/O request to an extent.
Figure 3:
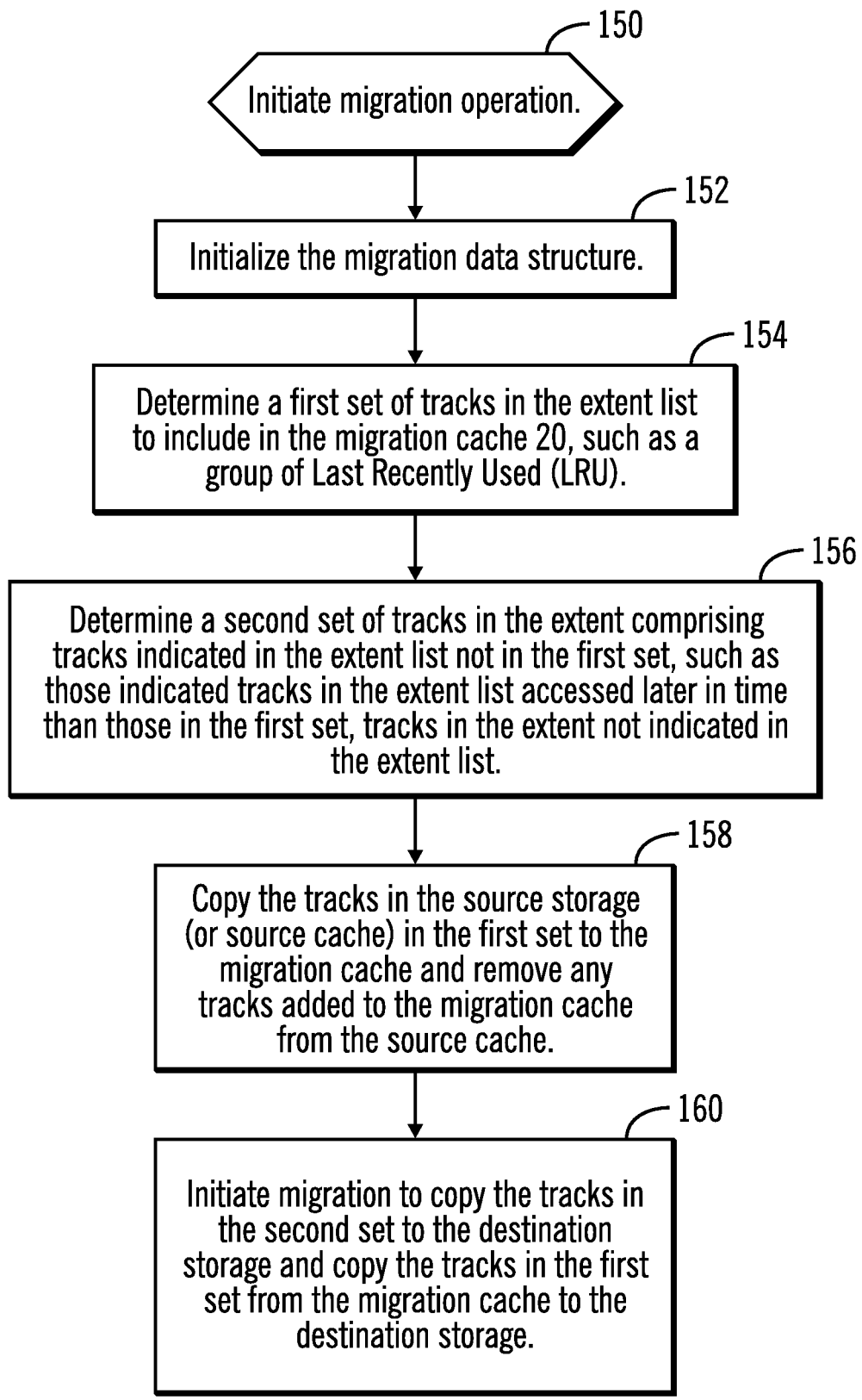
FIG. 3 illustrates an embodiment of operations to migrate an extent from a source storage to a destination storage.

FIG. 2 illustrates an embodiment of operations performed by the migration manager 14 to maintain the extent list 22 and determine whether to migrate an extent from the source storage 4 in which the extent is maintained to a destination storage 6. Upon receiving (at block 100) an Input/Output (I/O) request, e.g., read/write, directed to an extent in the source storage 4, the migration manager 14 indicates (at block 102) the track subject to the I/O request in the extent list 22. There may be a separate extent list 22 maintained for each extent managed by the server 2, or tracks for multiple extents may be managed in one extent list 22. In an alternative embodiment, the extent list 22 may only indicate write requests to the source storage 4 or there may be separate read and write extent lists. If (at block 104) the number of accesses to the extent indicated in the extent list 22 exceeds a threshold, which may be a high or low threshold, then the migration manager 14 initiates (at block 106) a migration operation to migrate the extent in the source storage 4 to a destination storage 6 (as shown in FIG. 3). In one embodiment, if the number of accesses exceeds a high threshold, such as a threshold for a designated time period, then that indicates the extent is a frequently accessed or a "hot" extent, and should be migrated to a faster access storage device, such as migrating the extent from a hard disk drive ("HDD") to a solid state storage device ("SSD"). Alternatively, the migration manager 14 or operating system 12 may determine to migrate an extent from a faster accessed device, e.g., SSD, to a slower access device, e.g., HDD, if accesses to the source storage 4 fall below a threshold for a time period.

In certain embodiments, the extent list 22 may be updated with respect to I/O activity to the extent prior to migration. During migration, the extent list 22 is used to determine tracks to add to the migration cache 20 and may not be updated during the migration.

FIG. 3 illustrates an embodiment of operations performed by the migration manager 14 to migrate an extent from the source storage 4 to the destination storage 6. Upon initiating (at block 150) a migration operation, the migration manager 14 initializes (at block 152) a migration data structure 26, such as a bitmap, to indicate that all tracks in the extent have not yet been copied or migrated from the source storage 4 to the destination storage 6. The migration manager 14 determines (at block 154) a first set of tracks in the extent list 22 to include in the migration cache 20. In one embodiment, the first set of tracks may comprise a subset of the last recently used (LRU) tracks. If the list 22 is a stack, then the first set may comprise a predetermined number or proportion of total tracks in the extent list 22 removed from the LRU end. In this way, the migration cache 20 may store those tracks in the extent subject to migration that are more likely to be accessed because they are the last recently used tracks. The migration manager 14 further determines (at block 156) a second set of tracks in the extent comprising tracks indicated in the extent list 22 not in the first set, such as those indicated tracks accessed later in time than those in the first set, and tracks in the extent not indicated in the extent list. In an embodiment where the extent list 22 comprises a stack, then the tracks in the second set may comprise tracks accessed from the first recently used (FRU) end of the stack, which follow the last track added to the extent list 22 from the LRU end of the stack.

The migration manager 14 copies (at block 158) the tracks in the source storage 4 or source cache 16 that are in the first set to the migration cache 20 and removes tracks added to the migration cache 20 from the source cache 16. During migration, updates to tracks maintained in the migration cache 20 are performed directly to the migration cache 20, thereby bypassing the source cache 16 and source storage 4. This avoids the cost of managing writes in the source cache 16 and destaging to the source storage 4. The migration manager 14 initiates (at block 160) the migration to copy the tracks in the second set from the source storage 4 to the destination storage 6 and copy the tracks in the first set from the migration cache 20 to the destination storage 6. In one embodiment, the migration manager 14 may copy the tracks in the extent from the migration cache 20 and source storage 4 in parallel, keeping track of which tracks are updated during migration, e.g., "dirty", and subsequently copying those updated (or "dirty") tracks to the destination storage 6. In one embodiment, the migration manager 14 may wait to copy all the tracks in the first set to the migration cache 20 before initiating the operation to copy the tracks in the migration cache 20 to the destination storage 6. Alternatively, the migration manager 14 may first copy tracks not in the migration cache 20, i.e., in the second set, to the destination storage 6 and write updates to tracks in the first set to the migration cache 20, and then copy the tracks in the migration cache 20 to the destination storage 6 after copying the tracks not in the migration cache 20, i.e., tracks in the source storage 4 or source cache 16. The migration manager 14 may further throttle the copying of tracks to the destination storage 6 to manage throughput through the source 4 and destination 6 storages to optimize data migration.

In embodiments where the destination storage 6 comprises a solid state storage device that deteriorates as a result of continued write requests, buffering frequently written tracks in the migration cache 20 during migration avoids degradation of the solid state storage device, where continual writing to the same physical location of a solid state device can wear out the storage blocks in the solid state storage device. In further embodiments, the extent list 22 may only indicate write requests and the migration cache 20 may only cache frequently written tracks, not frequently read tracks, to maximize the number of write tracks buffered in the migration cache 20, thereby reducing the number of writes to destage to the source storage 4 or migrate to the destination storage 6 during migration.

FIG. 4 illustrates an embodiment of operations the migration manager 14 performs to manage the migration and migration data structure 26. Upon receiving (at block 200) an acknowledgment that a track was successfully copied to the destination storage 6 as part of the migration operation, the migration manager 14 updates (at block 202) the migration data structure 26 to indicate that the track was migrated. If (at block 204) the migration data structure 26 indicates that all tracks are migrated to the destination storage 6, then the migration manager 14 indicates (at block 206) the migration of the extent as complete and removes the extent cache from the migration 20 and source 16 caches. Further, upon completing migration, the migration manager 14 may copy (at block 208) tracks in the migration cache 20 for the extent to the destination cache 18 in response to completing the migration of the extent to the destination storage 6. In this way, the more frequently accessed tracks of the extent, as indicated by being in the migration cache 20, are provided to the destination cache 18 as they are more likely to continue to be requested more frequently than other tracks from the destination storage 6 following the migration. Seeding the destination cache 18 with the tracks from the migration cache 20 avoids the need to stage those tracks in from the destination storage 6 if they are subsequently accessed, which is likely given that the migration cache 20 stores tracks more likely to be accessed. If (at block 204) the migration data structure 26 does not indicate that all tracks have been migrated, then control ends.

FIG. 5 illustrates an embodiment of operations performed by the migration manager 14 in response to the operating system 12 receiving an update to a track in the extent subject to ongoing migration. In response to receiving the update (at block 250), the migration manager 14, or a cache manager component, determines (at block 252) whether the track is located in the migration cache 20. If so, the update to the track is written (at block 254) to the migration cache 20. If not in the migration cache 20, then the track is written (at block 256) to the source cache 16, from which the track will be destaged to the source storage 4. A track may not be in the migration cache 20 if it was determined to be in the second set or if it is in the process of being copied to the migration cache 20 but not yet copied over (at block 158, FIG. 3). Updates to tracks in the migration cache 20 are not destaged to the source storage 4. After writing the update to cache 16 or 20, the migration data structure 26 is updated (at block 258) to indicate that the track in the extent has not been migrated or is dirty. This track indicated in the migration data structure 22 as dirty or not migrated will need to subsequently be copied to the destination storage 6 to complete the migration.

With the described embodiments of FIG. 5, hosts and applications may continue to write to the extent at the source storage 4 during migration because such writes received during migration are written to the caches 16 or 20. This avoids the need to lock the extent during migration.

Figure 6:
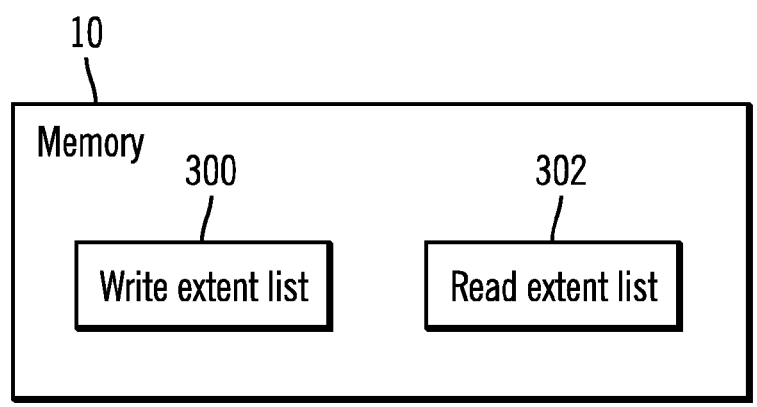
FIG. 6 illustrates an embodiment of extent lists used during migration.

FIG. 6 illustrates an embodiment of the memory 10 in which the extent list is implemented as a separate write extent list 300 and read extent list 302. The write extent list 300 indicates tracks in the extent subject to a write request prior to migration and the read extent list 302 indicates tracks in the extent subject to a read request prior to the migration. The first set of tracks added to the migration cache 20 may comprise tracks that are the last recently used (LRU) selected from both the write 300 and read 302 extent lists and the tracks in the second set may include tracks from the write 300 and read 302 extent lists that were accessed later in time than those tracks in the extent lists 300 and 302 in the first set migrated to the migration cache 20. The tracks selected from the extent lists 300 and 302 in the first set to add to the migration cache 20 may be selected based on the proportion of the tracks indicated in the extent lists 300 and 302, such that the tracks selected from the write list 300 to add to the migration cache may comprise the write list 300 proportion, of the total of tracks indicated in the lists 300 and 302, of the available space in the migration cache 20 and tracks selected from the read list 302 to add to the migration cache 20 may comprise the read list 302 proportion of the total of tracks indicated in the lists 300 and 302 of the available space in the migration cache 20, so that read and write tracks are added to the migration cache 20 according to their proportion of the combination of the lists 300 and 302.

Described embodiments provide techniques for using a migration cache during migration to buffer tracks that are more frequently accessed. During migration, the source storage may continue to receive reads and writes, and frequently accessed tracks are updated in the migration cache 20 so they do not need to be continually staged or destaged with respect to the source storage 4 or copied over to the destination storage 6 during the migration. This conserves the server 2 and storage 4, 6 resources by avoiding continual destaging and staging to the storages 4, 6 during migration.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In certain embodiments, the server of FIG. 1 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, the server of FIG. 1 may provide clients, and other servers and software and/or hardware components in the networked cloud, with storage and data processing services, including migration services. The server 2 may provide reliable storage and migration services and access to the storages 4 and 6 to meet quality of service requirements for customers in the cloud, including clients requiring storage and other servers providing storage services to clients. The server 2 may communicate with clients to provide storage services for the storages 4 and 6 through a web interface or other application programming interface.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 2-5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product for migrating data from a source storage to a destination storage, the computer program product comprising a computer readable storage medium having computer readable program code embodied therein that executes to perform operations, the operations comprising:
    indicating in an extent list tracks in an extent in the source storage subject to Input/Output (I/O) requests;
    initiating a migration operation to migrate the extent from the source storage to the destination storage; and
    in response to initiating the migration operation, performing:
        determining a first set of tracks in the extent in the source storage indicated in the extent list based on an access characteristic of the tracks in the extent;
        determining a second set of tracks in the extent, wherein the second set of tracks have the access characteristic to a lesser extent than the first set of tracks;
        copying the tracks in the source storage in the first set to a migration cache, wherein updates to the tracks in the migration cache during the migration operation are applied to the migration cache;
        copying the tracks in the second set directly from the source storage to the destination storage without buffering in the migration cache;
        copying the tracks in the first set from the migration cache to the destination storage; and
        completing the migration operation in response to copying the first set of tracks from the migration cache to the destination storage and copying the second set of tracks from the source storage to the destination storage, wherein after the migration the tracks in the extent are located in the destination storage.

2. The computer program product of claim 1, wherein the second set of tracks includes tracks in the extent indicated in the extent list that are not in the first set of tracks and tracks in the extent not indicated in the extent list.

3. The computer program product of claim 1, wherein the access characteristic comprises last recently used, wherein the extent list orders tracks according to last recently used, wherein the second set of tracks includes tracks in the extent indicated in the extent list that are not in the first set of tracks, and wherein the tracks in the first set have been more recently used according to the extent list ordering than the tracks in the second set.

4. The computer program product of claim 1, wherein the tracks in the migration cache are copied to the destination storage in response to copying all the tracks in the first set to the migration cache, and wherein the tracks in the migration cache and the source storage are copied in parallel to the destination storage.

5. The computer program product of claim 1, further performing during the migration operation:
    receiving an update to one track in the extent during the migration operation;
    determining whether the track is located in the migration cache;
    writing the update to the migration cache in response to determining that the track is in the migration cache, wherein the updated track is copied from the migration cache to the destination storage;
    writing the update to the source storage in response to determining that the track is not maintained in the migration cache.

6. The computer program product of claim 5, wherein the migration cache and a source cache are maintained in at least one memory device in a server in communication with the source storage and the destination storage, wherein writing the update to the source storage comprises writing the update to the source cache, wherein updated tracks in the source cache are destaged to the source storage and wherein updates to tracks in the migration cache are not destaged to the source storage.

7. The computer program product of claim 6, wherein the operations further comprise:
    maintaining a destination cache in the server for tracks in the destination storage;
    copying tracks in the migration cache for the extent to the destination cache in response to completing the migration of the extent to the destination storage.

8. The computer program product of claim 1, wherein the extent list indicates write requests to the source storage and not read requests, wherein the first set of tracks indicates only tracks in the source storage that have been updated prior to the migration operation.

9. The computer program product of claim 1, wherein the extent list comprises a write extent list indicating tracks in the extent subject to a write request and a read extent list indicating tracks in the extent subject to a read request, wherein the first set of tracks includes tracks indicated in the write and read extent lists, and wherein the second set of tracks includes tracks indicated in the write and read extent lists not included in the first set.

10. The computer program product of claim 9, wherein the access characteristics comprises last recently used, wherein most recently accessed tracks indicated in the write and read extent lists are included in the first set according to a proportion of the tracks indicated in the write and read extent lists.

11. A system for migrating data from a source storage to a destination storage, comprising:
    a computer memory;
    a migration manager executed to perform operations, the operations comprising:
        indicating in an extent list in the computer memory tracks in an extent in the source storage subject to Input/Output (I/O) requests;
        initiating a migration operation to migrate the extent from the source storage to the destination storage; and
        in response to initiating the migration operation, performing:
            determining a first set of tracks in the extent in the source storage indicated in the extent list based on an access characteristic of the tracks in the extent;

determining a second set of tracks in the extent, wherein the second set of tracks have the access characteristic to a lesser extent than the first set of tracks;

copying the tracks in the source storage in the first set to a migration cache in the computer memory, wherein updates to the tracks in the migration cache during the migration operation are applied to the migration cache;

copying the tracks in the second set directly from the source storage to the destination storage without buffering in the migration cache;

copying the tracks in the first set from the migration cache to the destination storage; and completing the migration operation in response to copying the first set of tracks from the migration cache to the destination storage and copying the second set of tracks from the source storage to the destination storage, wherein after the migration the tracks in the extent are located in the destination storage.

12. The system of claim 11, wherein the second set of tracks includes tracks in the extent indicated in the extent list that are not in the first set of tracks and tracks in the extent not indicated in the extent list.

13. The system of claim 11, further performing during the migration operation:

receiving an update to one track in the extent during the migration operation;

determining whether the track is located in the migration cache;

writing the update to the migration cache in response to determining that the track is in the migration cache, wherein the updated track is copied from the migration cache to the destination storage;

writing the update to the source storage in response to determining that the track is not maintained in the migration cache.

14. The system of claim 13, wherein the migration cache and a source cache are maintained in at least one memory device in a server in communication with the source storage and the destination storage, wherein writing the update to the source storage comprises writing the update to the source cache, wherein updated tracks in the source cache are destaged to the source storage and wherein updates to tracks in the migration cache are not destaged to the source storage.

15. The system of claim 14, wherein the operations further comprise:

maintaining a destination cache in the server for tracks in the destination storage;

copying tracks in the migration cache for the extent to the destination cache in response to completing the migration of the extent to the destination storage.

16. The system of claim 11, wherein the extent list comprises a write extent list indicating tracks in the extent subject to a write request and a read extent list indicating tracks in the extent subject to a read request, wherein the first set of tracks includes tracks indicated in the first and second extent lists, and wherein the second set of tracks includes tracks indicated in the first and second extent lists not included in the first set and tracks not indicated in the first and second extent lists.

17. The system of claim 11, wherein the access characteristic comprises last recently used, wherein the extent list orders tracks according to last recently used, wherein the second set of tracks includes tracks in the extent indicated in the extent list that are not in the first set of tracks, and wherein the tracks in the first set have been more recently used according to the extent list ordering than the tracks in the second set.

18. The system of claim 11, wherein the tracks in the migration cache are copied to the destination storage in response to copying all the tracks in the first set to the migration cache, and wherein the tracks in the migration cache and the source storage are copied in parallel to the destination storage.

19. The system of claim 11, wherein the extent list indicates write requests to the source storage and not read requests, wherein the first set of tracks indicates only tracks in the source storage that have been updated prior to the migration operation.

20. The system of claim 16, wherein the access characteristics comprises last recently used, wherein most recently accessed tracks indicated in the write and read extent lists are included in the first set according to a proportion of the tracks indicated in the write and read extent lists.

* * * * *